Apr. 17, 1923.
J. E. HARBURG
TOOL
Filed Dec. 21, 1921
1,451,727
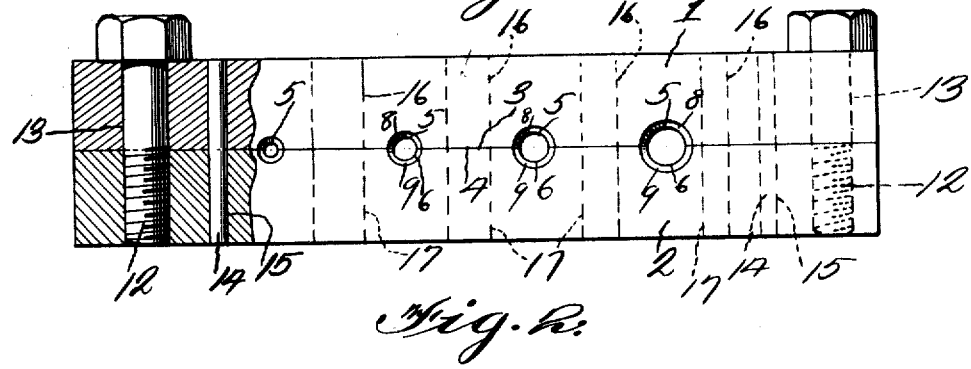
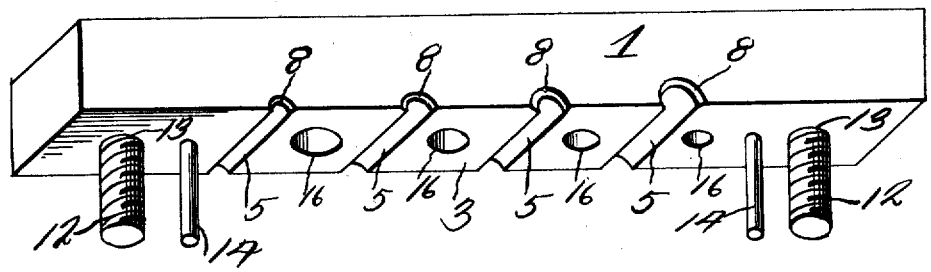
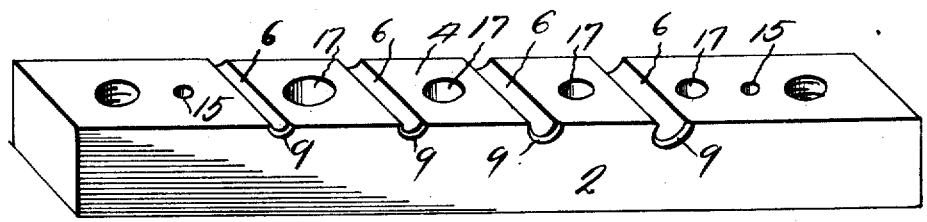
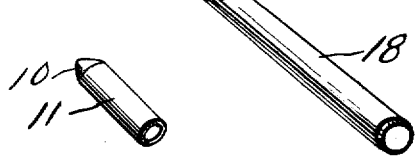
Inventor
J. E. Harburg
By D. Swift
his Attorney Patented Apr. 17, 1923.

1,451,727

UNITED STATES PATENT OFFICE.

JAMES E. HARBURG, OF DENVER, COLORADO, ASSIGNOR TO YERRICK MANUFACTURING CO., OF DENVER, COLORADO.

TOOL.

Application filed December 21, 1921. Serial No. 523,874.

*To all whom it may concern:*

Be it known that I, JAMES E. HARBURG, a citizen of the United States, residing at Denver, in the county of Denver, State of Colorado, have invented a new and useful Tool; and I do hereby declare the following to be a full, clear, and exact description of the invention, such as will enable others skilled in the art to which it appertains to make and use the same.

The invention relates to pipe flaring tools and shim punchers and has for its object to provide a device of this character comprising registering and engaging bars detachably connected together, the engaging faces of said bars being provided with spaced transversely disposed semi-circular grooves for the reception of various sizes of pipes, said grooves having adjacent ends bevelled thereby forming means for allowing the end of a pipe to be flared by a conically shaped tool.

A further object is to provide pins carried by one of the members and adapted to be received by registering apertures in the other member for holding the members together incident to securely securing the members together.

A further object is to provide the members with registering apertures for the reception of punchers whereby when a sheet of material is disposed between the members, a hole may be formed in the shim.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of the pipe flaring device, part being broken away to show one of the interengaging pins and the bolt for securing one end of the members together.

Figure 2 is a collective perspective view of the members of the device showing the same in position to be assembled.

Figure 3 is a perspective view of a pin used for punching holes in the shim.

Figure 4 is a perspective view of a pin having a conical end which pin is utilized for flaring the end of a pipe.

Referring to the drawings, the numeral 1 designates a member forming the upper half of the tool, and 2 a member forming the lower half of the tool. The inner faces 3 and 4 of the members 1 and 2 are provided with transversely disposed semi-circular grooves 5 and 6, which grooves are of different sizes and when brought together form openings of different diameters for the reception of different sizes of pipes, the ends of which are to be flared. The front ends of the grooves 5 and 6 are bevelled as at 8 and 9 thereby providing means whereby the end of the pipe will be allowed to expand when the conically shaped end 10 of an expanding pin 11 is driven into the end of the pipe which is securely clamped and held in the registering grooves 5 and 6, by means of bolts 12, which bolts pass through apertures 13 in the member 1 and are threaded into the lower member 2. To insure proper registration of the members 1 and 2 when the parts are being assembled, pins 14 are provided, which pins extend downwardly from the upper member 1 and are received in apertures 15 in the lower member 2, thereby insuring the proper registration of the members during an assembling operation. It will be seen that the end of a pipe may be easily and quickly clamped in the device and held therein during a flaring operation. Also the parts are simple in construction and the device as a whole comprises a minimum number of parts.

Extending vertically through the members 1 and 2, and at points between the grooves 5 and 6 are registering apertures 16 and 17, which apertures are used during the making of shims, which are formed from sheets of material, which are placed between the members 1 and 2 and have holes driven therein by means of pins 18 which are to be of different sizes corresponding to the size of the apertures 16 and 17. It will be seen that when a strip of material is disposed between the members 1 and 2 and one of the pins 18 placed in said aperture and driven downwardly, that an aperture will be punched in the shim.

The invention having been set forth what is claimed as new and useful is:—

A pipe holding device comprising a pair of parallel registering independent members having registering transversely disposed semi-circular grooves therein, the ends of said grooves being bevelled thereby allowing spreading of the end of a pipe when disposed between the members, bolts extending through the ends of said members and forming means whereby they may be securely clamped together and pins carried by one of said members and adapted to be received by apertures of the other member and forming means for guiding the members as they are moved together into registering engagement.

In testimony whereof I have signed my name to this specification in the presence of two subscribing witnesses.

JAMES E. HARBURG.

Witnesses:
ERNEST E. SCOTT,
DOROTHY SILVER.